Sept. 11, 1951     M. R. LOREE     2,567,775
FISH STRINGER APPARATUS
Filed May 11, 1949                                2 Sheets—Sheet 1
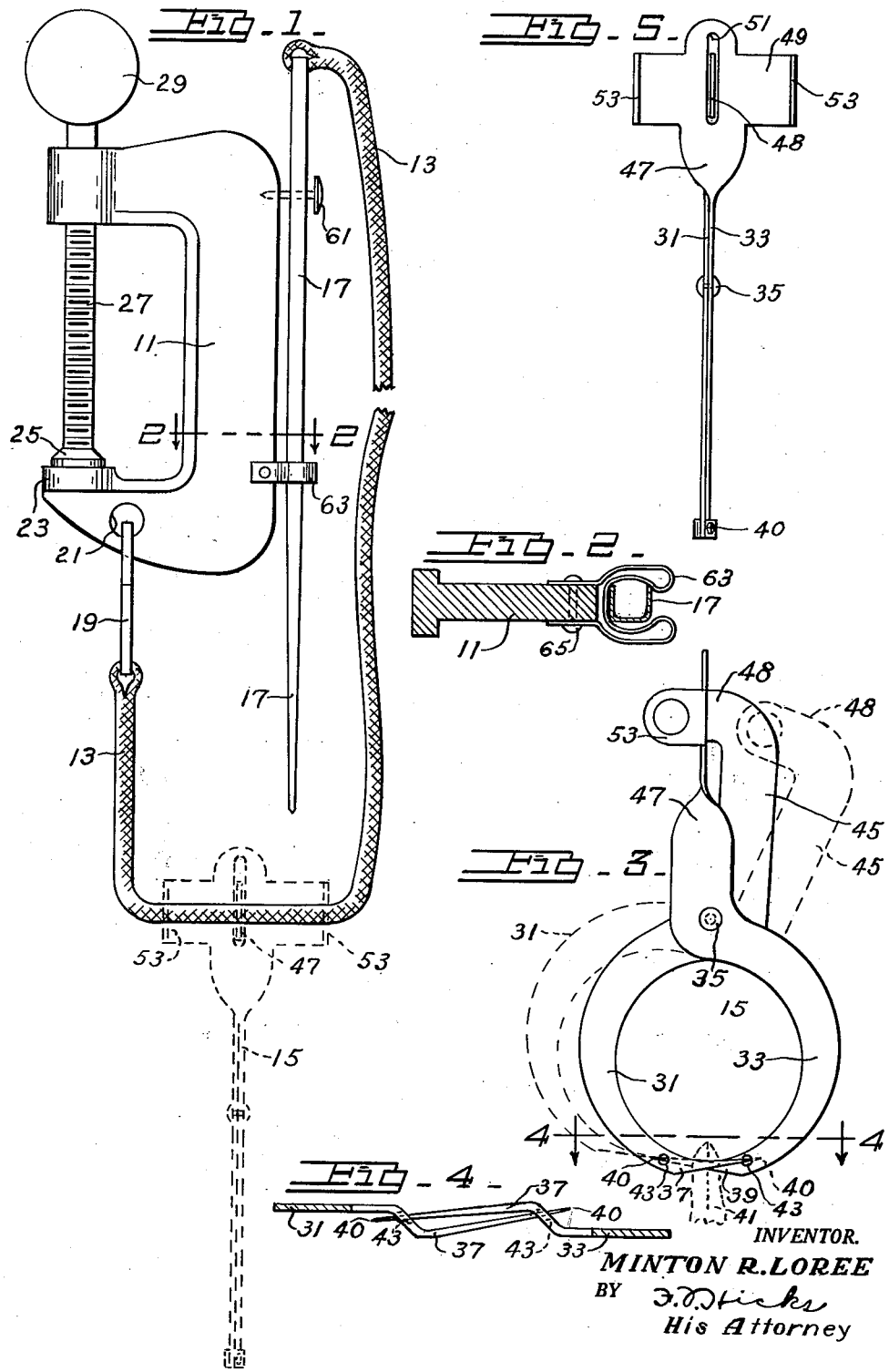
INVENTOR.
MINTON R. LOREE
BY
His Attorney Sept. 11, 1951 M. R. LOREE 2,567,775
FISH STRINGER APPARATUS
Filed May 11, 1949 2 Sheets-Sheet 2
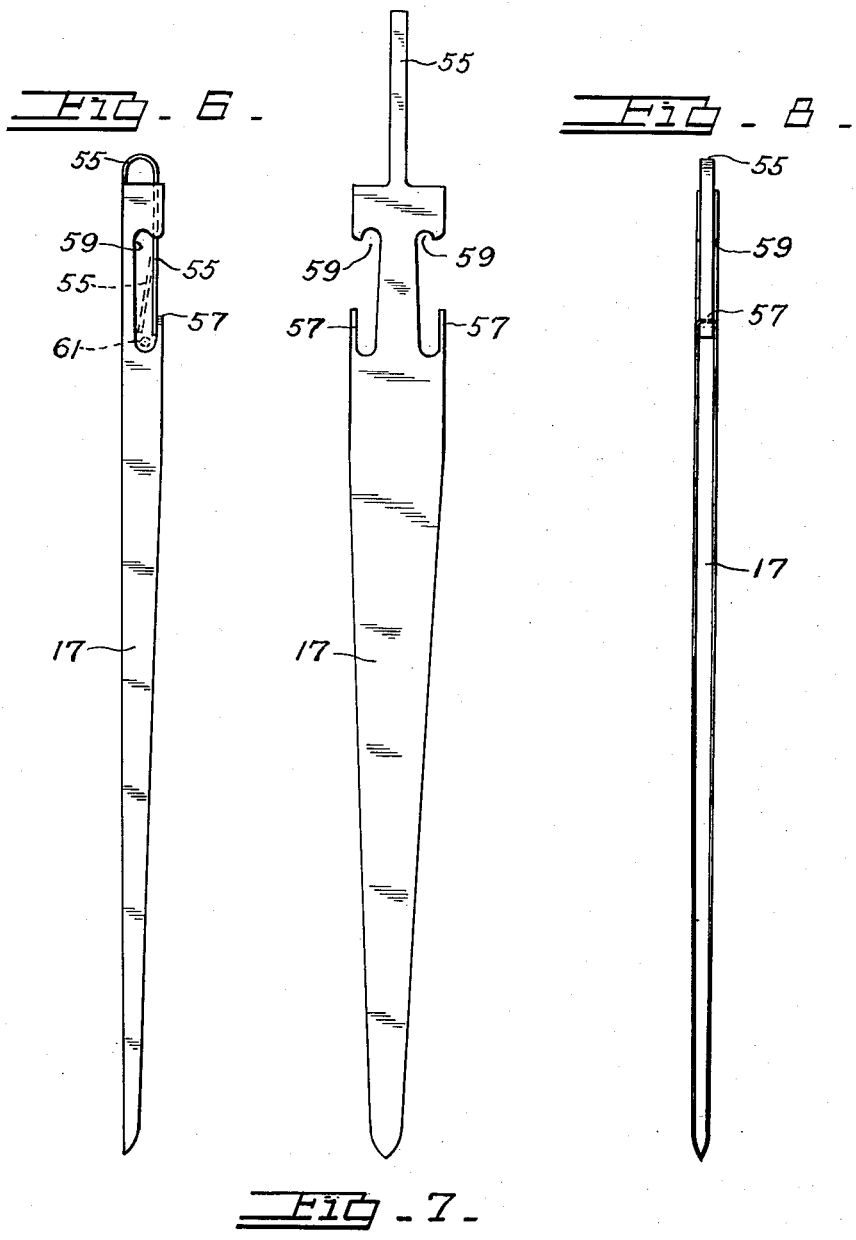
INVENTOR.
MINTON R. LOREE
BY
His Attorney Patented Sept. 11, 1951

2,567,775

UNITED STATES PATENT OFFICE 2,567,775

FISH STRINGER APPARATUS

Minton R. Loree, Mount Morris, Mich.

Application May 11, 1949, Serial No. 92,547

5 Claims. (Cl. 224—7)

1

The invention pertains to fish-stringer apparatus including improved elements and the improved combination of such elements. The invention herein is an improvement on that disclosed and claimed in my co-pending patent application Serial No. 744,313 filed April 28, 1947, now Patent No. 2,518,915.

It is an object of the invention to provide improved fish stringer apparatus or system for holding captured fish in the best possible preserved condition.

It is also an object of the invention to provide fish holding tongs which may be operated quickly and conveniently for safely and securely holding captured fish in water in a suitable manner for preserving the fish in a good condition.

It is a further object of the invention to provide such fish stringer apparatus wherein the fish holder tongs are strung upon a cable, or flexible member, which serves the purpose of holding the tongs locked upon or through the fish while also serving to trail the loaded tongs and fish in the water.

Another object of the invention is to provide an improved fish stringer needle for stringing fish holders or fish.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of the invention, in which:

Fig. 1 is a side elevational view showing the clamp and flexible member, the latter being partially broken away, representing a fish holding tong shown by dotted lines on the flexible member, and showing the needle secured on the clamp;

Fig. 2 is an enlarged sectional view on line 2—2 in Fig. 1;

Fig. 3 is a side elevational view showing one of the fish holding tongs closed, and its open position being represented by dotted lines;

Fig. 4 is an enlarged sectional view on line 4—4 in Fig. 3, for showing an interlocking relation of the sharp fish piercing points of the tong jaws;

Fig. 5 is an edge elevational view of the fish holding tongs;

Fig. 6 is a side elevational view of the fish-stringer needle showing the retainer slot and tongue;

Fig. 7 is a plan view of the blank of sheet metal before it has been bent to provide the improved fish stringer needle; and Fig. 8 is an elevational view of the open side of the fish stringer needle.

Referring more particularly to Figs. 1 and 2 of the drawings, it will be seen that I have provided an illustrative disclosure of my improved fish stringer system which comprises an attachment clamp 11, an elongated flexible member or cable 13 secured thereto, fish holding tongs 15 (of which a plurality are provided to suit the needs of the fisherman) and a fish stringer needle 17 for stringing the loaded tongs upon the cable 13 and then conveniently securing one end of the cable in detachable relation back of the clamp. The other end of cable 13 is provided with any convenient securing means, such as a well known snap fastener 19, whereby it is secured into an aperture 21 in the clamp.

One jaw 23 of the clamp 11 is approached by a movable jaw 25 carried adjustably on the end of a screw 27 passing threadably through the other end of the clamp, and at its outer end having a thumb tab 29 or other means for conveniently turning the screw, in a manner common with C-clamps, to secure the clamp to any suitable object such as the gunwale or seat of a boat, or to a post or a wharf. The elongated flexible member 13 may be any suitable waterproof cable or cord, but I have found that a braided or stranded cord of plastic strands, such as nylon for example, is very satisfactory for this purpose, and is available on the market.

As Figs. 3, 4 and 5 show, the fish holding tongs 15 each comprise a pair of jaws 31 and 33 which may be stamped out of sheet stainless steel, or other corrosion resistant material, in substantially crescent shapes. These jaws are pivotally joined by a pivot pin 35 to cooperatively open and close their oppositely disposed swinging ends 37 and 39. These ends 37 and 39 are provided with sharp points 40 which easily pierce the lips of a fish 41, shown dotted in Fig. 3, as the tongs are closed thereon. If desired, an interlocking arrangement may be provided, to more safely secure the fish, by providing the jaw ends 37 and 39 long enough to overlap the sharp points 40 and each jaw end being provided with a point receiving aperture 43 at a suitable position to receive the sharp point of the cooperative jaw just as the pair of jaws are pressed into a final closed position.

Oppositely extending ends 45 and 47 of the jaws 31 and 33 are conformed for convenient stringing upon the cable which then serves also to lock the tongs locked shut together. This is readily accomplished by providing a laterally extending apertured locking lug 48, preferably in the same operation of stamping out the jaw 31, to lie substantially in the same plane and to approach the locking end 47 of the other jaw when the tong is closed. The upper portion of this locking end 47 is formed with a locking plate 49 having a central slot 51 and this end is twisted at right angles to the plane of the crescent shaped jaw 33 so that this central slot receives the lug 48 therethrough when the tongs are closed. Also the locking plate 49 may be provided with two apertured lugs 53 being bent at right angles to the locking plate so that these two apertured lugs are in alignment with and on opposite sides of the lug 48 when the tongs are closed to pierce and hold a fish. The cable 13 is easily led through the single apertured lug 48, or when three lugs are provided, through the three apertured lugs by means of the needle 17. The cable then holds the tongs locked in clamping position on the fish while also serving to trail the fish along in the water by the boat on the loaded tongs, of which there may be a large number slidably disposed or threaded upon the cable. Such tongs can be opened and closed by one hand to secure fish without releasing same which may be safely held in the other hand until the tongs are strung upon the cable.

The fish stringer needle 17 is of such a construction that it may be formed of a single piece or blank stamped out of sheet metal, which is also preferably stainless steel or some other corrosion resistant material, but which is preferably thinner and of lighter gauge than the jaws of the tongs.

Fig. 7 shows a blank of sheet metal of suitable shape to form the needle, which is accomplished by merely bending it up on both sides of the axis to a substantially U-shaped or channel cross-section. This cross-section may be observed in the Fig. 2 for example. A tongue 55 extends from the blank and it is bent and turned back into the U-shaped cross-section and then two retainer lugs 57 are turned in to hold the tongue, as seen in Fig. 8. The adjacent edges are provided with slots 59 opening to the side adjacent the tongue 55, to receive the stem of a headed retainer pin 61 projecting from the back of the clamp 11. This operation of attaching the needle 17 on the clamp is represented in dotted lines in Fig. 6. After the tongue 55 has been pressed on the pin 61, to the dotted line position, the tongue then snaps out and serves as holding means whereby the needle is held upon the pin 61, the latter having a head too large to pass through the side slots 59 in the needle. To release the needle from the clamp, it is only necessary to depress the resilient tongue 55 by means of the thumb, in the same manner as a snap fastener is commonly released. The needle 17 is also conveniently pressed into a spring clip 63 formed by bending a resilient metal strip and securing the ends thereof to the sides of the back of the clamp 11 by means of a rivet 63, as may be seen in Figs. 1 and 2. One end of the cable 13 is braided into or through the loop of the tongue 55 on the needle for attachment thereto.

The other end of the fish stringing needle is made rather sharp and pointed to facilitate threading the apertured lugs of the fish holding tongs thereon. Also the pointed shape of the needle is such that it may also be utilized for threading directly through the lips of the mouth or through the gill of a fish, if that is desired for the last few fish caught or after all the tongs have been loaded. However, it has been found by actual use that there are substantial advantages in holding the captured fish by means of the sharp piercing points of the tongs passed through the lips of the fish which preserves the fish in good condition for a longer time.

It is apparent that within the scope of my invention modifications and different arrangements may be made other than herein disclosed, and the present disclosure is illustrative merely, the invention comprehending variations thereof.

What is claimed as the invention is:

1. In a fish-stringer the combination of, clamp means suitable for attachment mounting, an elongated flexible member having one end attached to said clamp, a slender elongated needle attached to the other end of said flexible member for threading fish holding tongs thereon, conveniently releasable lock means for holding said needle on said clamp means with fish holding tongs disposed on a closed loop of the flexible member, a fish holding pair of tongs having a pair of cooperative fish piercing jaws with opposite locking ends conformed to receive said flexible member in a threaded relation for locking the tongs closed in fish holding relation so long as the tongs are on said flexible member, and further characterized by the locking ends of said pair of fish holding tongs being conformed to present three apertures in aligned relation for receiving the flexible member threaded therethrough when the tongs are closed.

2. Fish holding tongs comprising, a pair of pivotally joined jaws having cooperative ends pointed and conformed for cooperatively piercing and holding a fish when closed, said jaws having oppositely disposed locking ends conformed to receive a flexible cable or member in a threaded relation for holding the tongs closed, one of said locking ends being twisted at right angles to the plane of the jaw and slotted to receive the locking end from the other jaw member, and said latter locking end being apertured and conformed to pass through said slotted end when the tongs are closed.

3. Fish holding tongs in accordance with claim 2 and further characterized by the twisted locking end having the slot substantially in the mid-portion thereof and having apertured lugs projecting on both sides thereof, and said apertured lugs being bent at substantially right angles to the twisted end so that the three apertures are disposed in spaced apart aligned relation when the tongs are closed.

4. A fish-stringer needle for stringing fish or fish holders comprising, a piece of sheet metal shaped and bent to provide an elongated member of substantially a U-shaped cross-section pointed at one end, and the other end of said member having an integral tongue bent back into the member to provide quick locking and releasable holding means.

5. A fish-stringer needle for stringing fish or fish holders comprising, a piece of sheet metal shaped and bent to provide an elongated member of substantially a U-shaped cross-section pointed at one end, the edges of the sides being recessed at the other end of said member, and the said other end of the member having a tongue extending integral therewith and bent back into the U-shaped cross-section of the member which also has retainer means bent in to hold the end of the tongue.

MINTON R. LOREE.

REFERENCES CITED

The following references are of record in the file of this patent:

UNITED STATES PATENTS

| Number | Name | Date |
|---|---|---|
| 849,410 | Mills | Apr. 9, 1907 |
| 1,095,054 | Wiesenfeld | Apr. 28, 1914 |
| 1,316,409 | Bahre | Sept. 16, 1919 |
| 1,489,194 | Connolly | Apr. 1, 1924 |
| 2,047,834 | Plasters | July 14, 1936 |
| 2,226,402 | Hirschmann | Dec. 24, 1940 |
| 2,437,331 | Murray et al. | Mar. 9, 1948 |
| 2,441,450 | Smigleski | May 11, 1948 |
| 2,519,528 | Williamson | Aug. 22, 1950 |